(12) United States Patent
Sung et al.

(10) Patent No.: US 9,411,372 B1
(45) Date of Patent: Aug. 9, 2016

(54) WEARABLE DEVICE

(71) Applicant: Acer Incorporated, New Taipei (TW)

(72) Inventors: Te-Jen Sung, New Taipei (TW);
Shao-Chi Chuang, New Taipei (TW);
Sheng-Wen Wu, New Taipei (TW);
Tsung-Hsun Wu, New Taipei (TW);
Kuo-Hui Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/799,548

(22) Filed: Jul. 14, 2015

(30) Foreign Application Priority Data

Feb. 11, 2015 (TW) .............................. 104104524 A

(51) Int. Cl.
*G06F 1/16* (2006.01)
(52) U.S. Cl.
CPC .............. *G06F 1/1635* (2013.01); *G06F 1/163* (2013.01)
(58) Field of Classification Search
CPC ...................................................... G06F 1/163
See application file for complete search history.

(56) References Cited

U.S. PATENT DOCUMENTS

| | | | | | |
|---|---|---|---|---|---|
| 4,985,878 A | * | 1/1991 | Yamada | ............. | G04B 37/0472 368/223 |
| 5,262,763 A | * | 11/1993 | Okuyama | ............ | G04G 9/0064 345/169 |
| 5,416,730 A | * | 5/1995 | Lookofsky | ............. | G06F 1/163 361/679.02 |
| 6,137,675 A | * | 10/2000 | Perkins | ................... | G06F 1/163 128/876 |
| 6,754,069 B2 | * | 6/2004 | Harada | ................ | G06F 1/1601 361/679.03 |
| 8,289,815 B2 | * | 10/2012 | Gracia | ................. | G04B 37/148 368/281 |
| 2014/0362673 A1 | | 12/2014 | Earl | | |
| 2015/0070226 A1 | * | 3/2015 | Wong | ..................... | H01Q 1/273 343/718 |
| 2016/0034002 A1 | * | 2/2016 | Yang | ....................... | G06F 1/163 361/679.03 |

FOREIGN PATENT DOCUMENTS

| | | |
|---|---|---|
| CN | 101740734 | 6/2010 |
| CN | 101365992 | 6/2013 |
| CN | 103888563 | 6/2014 |
| TW | M382749 | 6/2010 |

\* cited by examiner

*Primary Examiner* — Lisa Lea Edmonds
(74) *Attorney, Agent, or Firm* — Jianq Chyun IP Office

(57) ABSTRACT

A wearable device includes a battery casing, an upper machine body, a first elastic member and a button. The battery casing has a battery accommodating space and an engaged member. The upper machine body is pivotally connected to the battery casing to cover or expose the battery accommodating space. Two ends of the first elastic member are fixed to the upper machine body and the button, respectively. The button includes a hook movably fixed to or released from the engaged member. When the battery casing is at a first position, the upper machine body covers the battery casing to shield the battery accommodating space, and the hook is fixed to the engaged member. Pushing the button to press the first elastic member, the button is released from the engaged member, and the battery casing is rotated to a second position to expose the battery accommodating space.

10 Claims, 5 Drawing Sheets

WEARABLE DEVICE

CROSS-REFERENCE TO RELATED APPLICATION

This application claims the priority benefit of Taiwan application serial no. 104104524, filed on Feb. 11, 2015. The entirety of the above-mentioned patent application is hereby incorporated by reference herein and made a part of this specification.

BACKGROUND OF THE DISCLOSURE

1. Field of the Disclosure

The disclosure relates to a wearable device and more particularly, to a battery-replaceable wearable device.

2. Description of Related Art

As the technology of mobile communication advances in recent years, mobile communication devices have been developed to provide more and diverse functions. Because of the trend of the market and expectation of the consumers, wearable communication devices (e.g., smart watch, etc.) are drawing more and more attention. The so-called smart watch is a multi-functional watch having communicating, counting or other functions. Under the circumstances that the smart phones currently on the market have become saturated, compared to the smart phones, the smart watches have advantages of being lighter and compact, and user may directly wear.

For considering of cost and space, generally the battery of the smart watches is mostly irreplaceable. When the smart watch is operated and used after a long time, the power of the battery of the smart watch may be rapidly consumed. In general, the smart watch has to be taken off to be recharged, and it is time consuming and inconvenient. If the battery cannot be recharged at once, the user may not be able to use the smart watch, thus may feel awkward.

SUMMARY OF THE DISCLOSURE

The disclosure provides a wearable device, wherein the battery thereof may be rapidly and conveniently replaced.

The application provides a wearable device including a battery casing, an upper machine body, a first elastic member and a button. The battery casing has a battery accommodating space and includes an engaged member. The upper machine body is pivoted to the battery casing, so as to shield or expose the battery accommodating space. The first elastic member includes two opposite ends, and an end of the two opposite ends of the first elastic member is fixed to the upper machine body. The button is fixed to the other end of the two opposite ends of the first elastic member and includes a hook, wherein the hook is movably fixed to or released from the engaged member of the battery casing. When the battery casing is at a first position related to the upper machine body, the upper machine body covers the battery casing to shield the battery accommodating space, and the hook is fixed to the engaged member of the battery casing normally, so as to fix relative positions between the battery casing and the upper machine body. The button is pushed to press the first elastic member, so that the hook is released from the engaged member, the battery casing is adapted to be rotated to a second position relative to the upper machine body, so as to expose the battery accommodating space.

According to an exemplary embodiment of the disclosure, the wearable device further includes a second elastic member disposed between the upper machine body and the battery casing.

According to an exemplary embodiment of the disclosure, the second elastic member is a pogo pin.

According to an exemplary embodiment of the disclosure, the wearable device is a watch or a belt.

According to an exemplary embodiment of the disclosure, when the battery casing is at the first position related to the upper machine body, a part of a side surface of the upper machine body covers a side surface of the battery casing.

According to an exemplary embodiment of the disclosure, the wearable device further includes a first belt structure and a second belt structure, wherein the first belt structure is disposed at the battery casing, the second belt structure is disposed at the upper machine body, and the first belt structure and the second belt structure are coplanar.

According to an exemplary embodiment of the disclosure, the wearable device further includes a lower casing body fixed to the upper machine body, and the battery casing is located between the upper machine body and the lower casing body.

According to an exemplary embodiment of the disclosure, the wearable device further includes a door pivoted to the upper machine body or the battery casing, so as to shield a side surface of at least one of the upper machine body and the battery casing.

According to an exemplary embodiment of the disclosure, the upper machine body includes a display module.

According to an exemplary embodiment of the disclosure, one of side surfaces of the battery casing has a bending curvature or a notch.

In light of the above, when the battery of the wearable device provided in the disclosure is to be replaced, since the upper machine body is pivoted to the battery casing, only by pushing the button to press the first elastic member, then the hook is released from the engaged member. As such, the battery casing is rotated relative to the upper machine body, so as to expose the battery accommodating space. After battery replacing is completed, by only rotating back the battery casing, the first elastic member may push the hook to the engaged member of the battery casing, and the relative positions between the battery casing and the upper machine body may be fixed, thereby facilitating users to rapidly and conveniently replace the battery of the wearable device.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
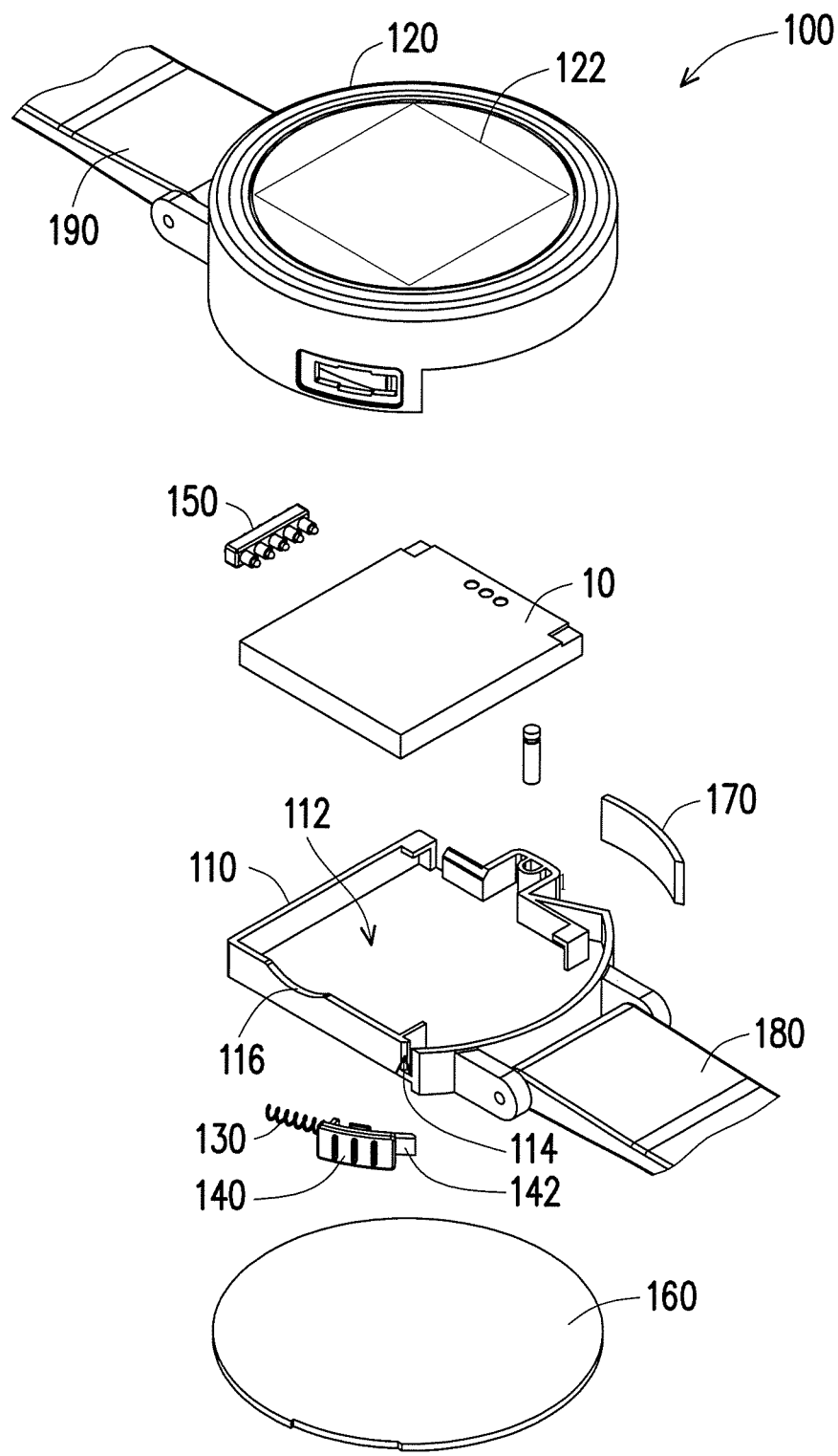
FIG. 1 is an exploded schematic view of a wearable device according to an embodiment of the disclosure.

FIG. 1 is an exploded schematic view of a wearable device according to an embodiment of the disclosure. Referring to FIG. 1, in the present embodiment, a wearable device 100 is exemplarily shown as a watch, in more detailed, the wearable device 100 is a smart watch, for example. However, in other embodiments, the wearable device 100 may be a smart belt, a smart neck ring, or the like, and the types of the wearable device 100 are not limited thereto.

The wearable device 100 of the embodiment includes a battery casing 110, an upper machine body 120, a first elastic member 130, a button 140, a second elastic member 150, a lower casing body 160, a door 170, a first belt structure 180 and a second belt structure 190. As shown in FIG. 1, the battery casing 110 has a battery accommodating space 112 for accommodating a battery 10. The battery casing 110 includes an engaged member 114, and one of the side surfaces of the battery casing 110 has a notch 116.

The upper machine body 120 includes a display module 122. The wearable device 100 of the embodiment may display body indexes or other information such as heartbeat of the user, blood pressure, time, and the like via the display module 122 of the upper machine body 120. In one embodiment, the display module 122 may be a touch display module, and the user may input commands by touching the display module 122 of the upper machine body 120.

In the embodiment, the upper machine body 120 is pivoted to the battery casing 110 via a pivoting shaft, so as to shield or expose the battery accommodating space 112. As shown in FIG. 1, the height of a part of a side surface of the upper machine body 120 (e.g., the left portion of the side surface shown in FIG. 1) is larger than the height of another part of the side surface of the upper machine body 120 (e.g., the right portion of the side surface shown in FIG. 1). Therefore, when the upper machine body 120 and the battery casing 110 are assembled together, a part of the side surface of the upper machine body 120 (e.g., the left portion of the side surface shown in FIG. 1) may cover the corresponding side surface of the battery casing 110.

In the present embodiment, the first elastic member 130 is a spring. The first elastic member 130 includes two opposite ends, and an end of the two opposite ends of the first elastic member 130 is fixed to the upper machine body 120, and the other end of the first elastic member 130 is fixed to the button 140. The button 140 includes a hook 142. Turning the button 140 to press the first elastic member 130 may let the button 140 move relative to the upper machine body 120, such that the hook 142 is movably fixed to or released from the engaged member 114 of the battery casing 110. The second elastic member 150 is disposed between the upper machine body 120 and the battery casing 110. In this embodiment, the second elastic member 150 may be a pogo pin, but the types of the first elastic member 130 and the second elastic member 150 are not limited thereto.

The lower casing body 160 is fixed on the upper machine body 120, and the battery casing 110 is located between the upper machine body 120 and the lower casing body 160. In the embodiment, the battery casing 110 is pivoted to the upper machine body 120; therefore the battery casing 110 may rotate relative to the upper machine body 120 and the lower casing body 160. The material of the upper machine body 120 and the lower casing body 160 may be metal, so as to provide a more preferable appearance quality to the wearable device 100, and the material of the battery casing 110 may be plastic, so as to reduce the weight of the wearable device 100. Certainly, the materials of the battery casing 110, the upper machine body 120 and the lower casing body 160 are not limited thereto.

In addition, in the embodiment, the door 170 is pivoted to the battery casing 110, so as to shield portions of the side surfaces of the upper machine body 120 and the battery casing 110, in order to achieve the effect of hiding ugliness and complete the exterior appearance of the wearable device 100. According to other embodiments, the door 170 may also be pivoted to the upper machine body 120.

In the embodiment, the first belt structure 180 and the second belt structure 190 are watch bands, wherein the first belt structure 180 is pivoted to the battery casing 110, the second belt structure 190 is pivoted to a lower position of the side surface of the upper machine body 120, such that the first belt structure 180 and the second belt structure 190 may be able to be located at the same plane.

Figure 2:
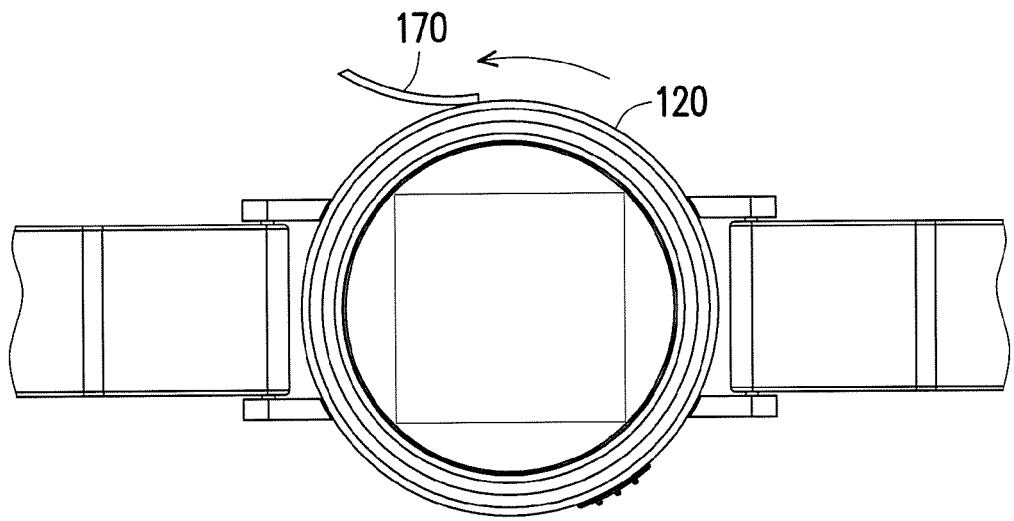
FIG. 2 through FIG. 7 are schematic flow diagrams illustrating a process of replacing battery of the wearable device as depicted in FIG. 1.

Through the abovementioned structure, the wearable device 100 of the embodiment may achieve the effect that the battery 10 may be easily replaced, and the detailed description is illustrated as follows. FIG. 2 through FIG. 7 are schematic flow diagrams illustrating a process of replacing battery of the wearable device as depicted in FIG. 1. First, referring to FIG. 1 and FIG. 2 together, under normal situation, the battery casing 110 is in the first position P1 relative to the upper machine body 120, namely the upper machine body 120 is overlapped with the battery casing 110. In this situation, since the upper machine body 120 covers the battery casing 110, the battery accommodating space 112 within the battery casing 110 may be shielded by the upper machine body 120. The hook 142 is movably fixed to the engaged member 114 of the battery casing 110, and the relative positions between the battery casing 110 and the upper machine body 120 are fixed. If the battery 10 is to be replaced, first the door 170 is turned as shown in FIG. 2, in order to make room for the battery casing 110 to rotate relative to the upper machine body 120.

Figure 3:
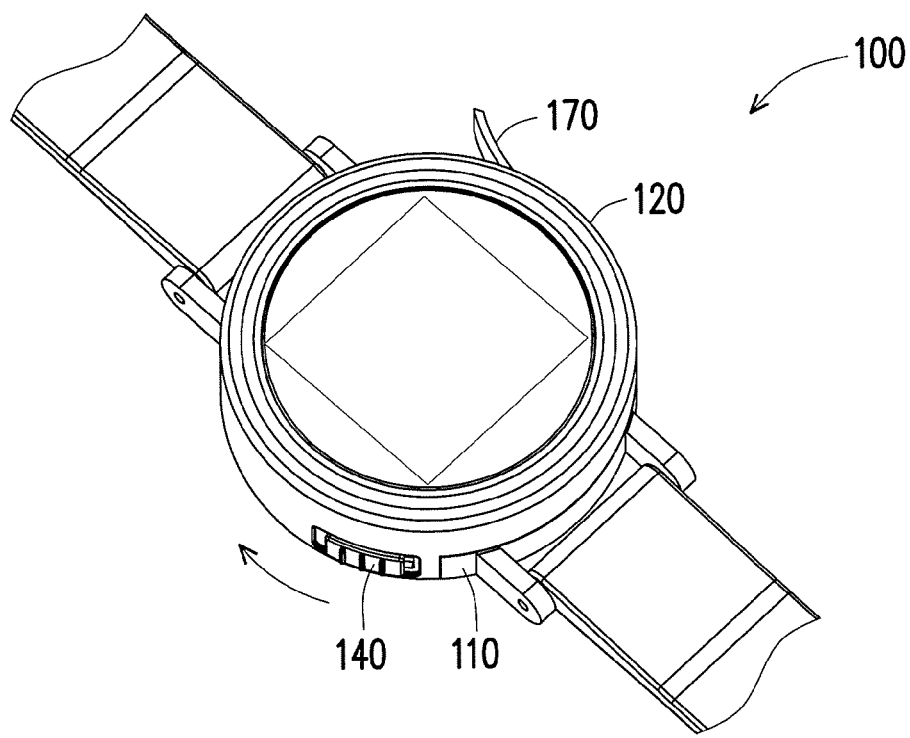
Figure 4:
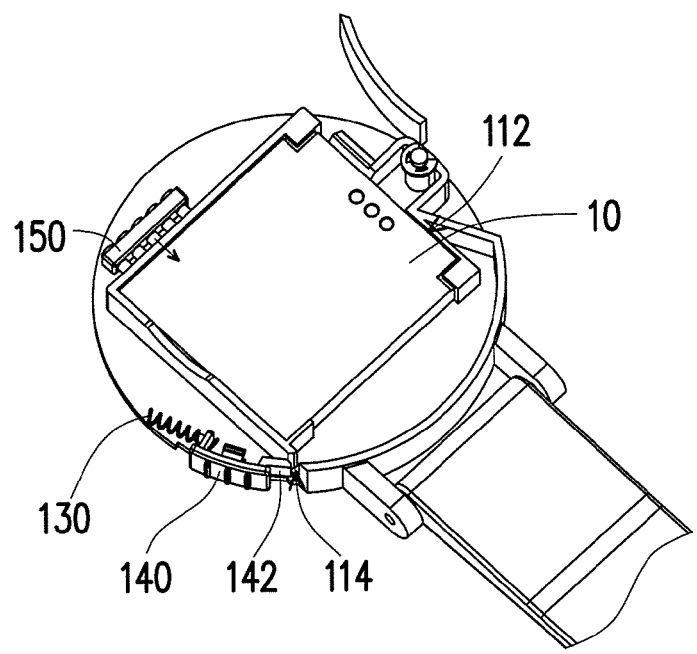
Figure 5:
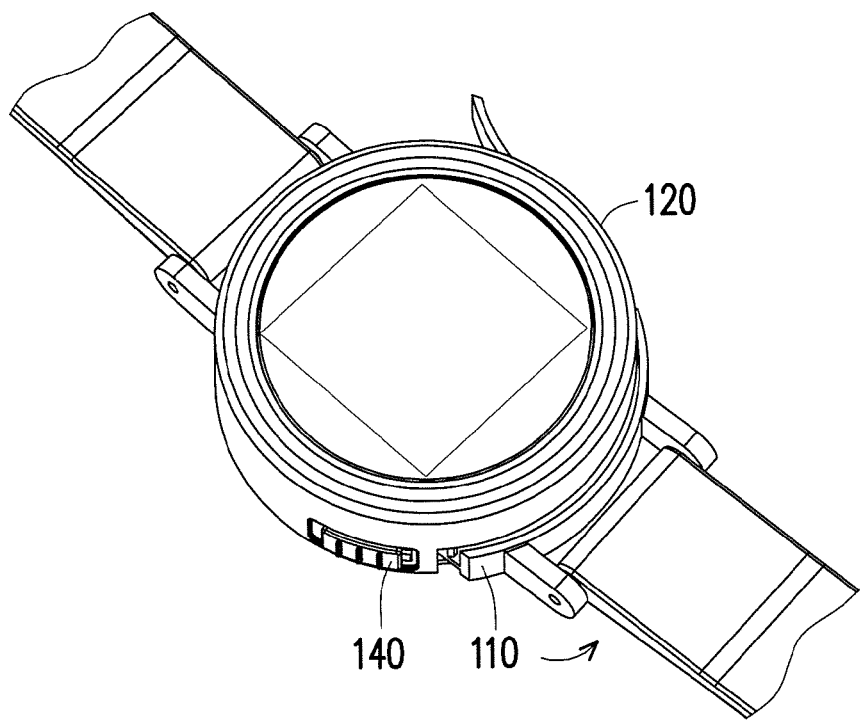

Then, referring to FIG. 3 and FIG. 4 together, FIG. 4 is a schematic view in which the upper machine body of FIG. 3 is omitted. The user may push the button 140 in a clockwise direction of the drawing so as to press the first elastic member 130, then the hook 142 of the button may be released from the engaged member 114, so that the battery casing 110 and the upper machine body 120 are unlatched. In the embodiment, since the second elastic member 150 is disposed between the upper machine body 120 and the battery casing 110, when the hook 142 of the button 140 is released from the engaged member 114, the second elastic member 150 may apply a push force to the battery casing 110. In addition, since the battery casing 110 is pivoted to the upper machine body 120, the battery casing 110 may rotate a small amount of distance relative to the upper machine body 120 slightly in a counter clockwise direction, as shown in FIG. 5. In other words, after the user pushes the button 140, the battery casing 110 and the first belt structure 180 pivoted to the battery casing 110 may slightly spring to outside, so as to facilitate the user to manually rotate.

Figure 6:
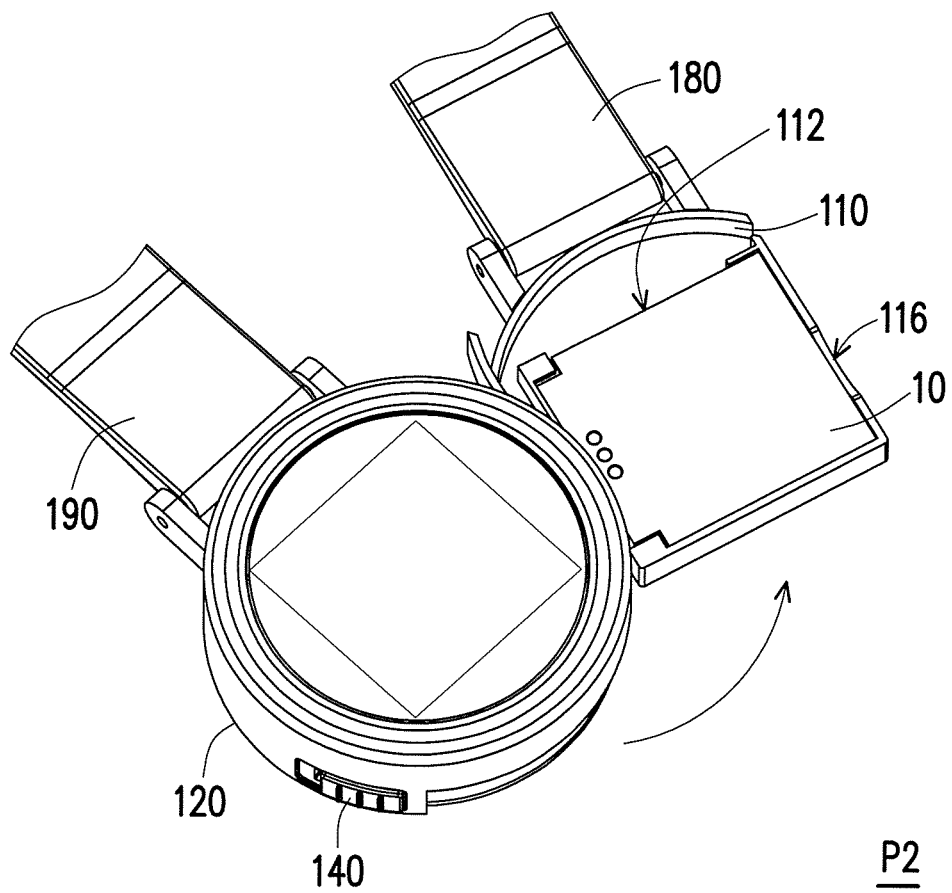

Referring to FIG. 6, the user may rotate the battery casing 110 to the second position P2 relative to the upper machine body 120, thereby exposing the battery accommodating space 112. In the present embodiment, the notch 116 formed on one of the side surfaces of the battery casing 110 may facilitate the user to take out the battery. Certainly, in other embodiments, one of the side surfaces of the battery casing 110 may have an outwardly bending curvature, such that the user may use the finger or finger nail to stretch into and take out the battery.

Figure 7:
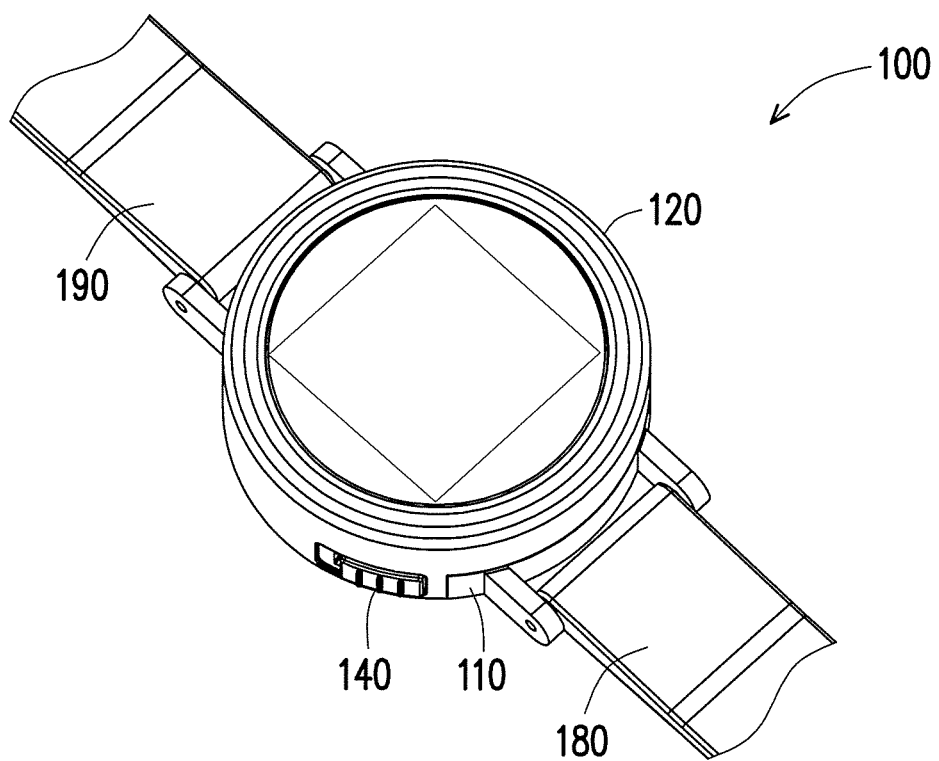

After the new battery 10 is installed, the user may turn the battery casing 110 in clockwise direction. At this moment, as shown in FIG. 3, by again pushing the button 140 in clockwise direction to let the battery casing 110 back to the first direction P1, the user may release the force applied to the button, then the first elastic member 130 may push the button 140 in counter clockwise direction, so that the hook 142 of the button 140 may be movably fixed to the engaged member 114 of the battery casing 110. After that, by closing the door 170 to the battery casing 110 and the upper machine body 120, the wearable device 100 may return to the normal situation as shown in FIG. 7.

In light of the foregoing, when the battery of the wearable device provided in the disclosure is to be replaced, since the upper machine body is pivoted to the battery casing, only by pushing the button to press the first elastic member, then the hook is released from the engaged member. As such, the battery casing is rotated relative to the upper machine body, so as to expose the battery accommodating space. After battery replacing is completed, by only rotating back the battery casing, the first elastic member may push the hook to the engaged member of the battery casing, and the relative positions between the battery casing and the upper machine body may be fixed, thereby facilitating users to rapidly and conveniently replace the battery of the wearable device.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A wearable device, comprising:
   a battery casing having a battery accommodating space and comprising an engaged member;
   an upper machine body pivoted to the battery casing for shielding or exposing the battery accommodating space;
   a first elastic member comprising two opposite ends, an end of the two opposite ends of the first elastic member fixed to the upper machine body; and
   a button fixed to the other end of the two opposite ends of the first elastic member and comprising a hook, wherein the hook is movably fixed to or released from the engaged member of the battery casing,
   wherein when the battery casing is at a first position related to the upper machine body, the upper machine body covers the battery casing to shield the battery accommodating space, and the hook is fixed to the engaged member of the battery casing normally, so as to fix relative positions between the battery casing and the upper machine body,
   wherein when pushing the button to press the first elastic member, the hook is released from the engaged member, the battery casing is adapted to be rotated to a second position relative to the upper machine body, so as to expose the battery accommodating space.

2. The wearable device as claimed in claim 1, further comprising:
   a second elastic member disposed between the upper machine body and the battery casing.

3. The wearable device as claimed in claim 2, wherein the second elastic member is a pogo pin.

4. The wearable device as claimed in claim 1, wherein the wearable device is a watch or a belt.

5. The wearable device as claimed in claim 1, wherein when the battery casing is at the first position related to the upper machine body, a part of a side surface of the upper machine body covers a side surface of the battery casing.

6. The wearable device as claimed in claim 1, further comprising:
   a first belt structure disposed at the battery casing; and
   a second belt structure disposed at the upper machine body, the first belt structure and the second belt structure coplanar.

7. The wearable device as claimed in claim 1, further comprising:
   a lower casing body fixed to the upper machine body, the battery casing located between the upper machine body and the lower casing body.

8. The wearable device as claimed in claim 1, further comprising:
   a door pivoted to the upper machine body or the battery casing, so as to shield a side surface of at least one of the upper machine body and the battery casing.

9. The wearable device as claimed in claim 1, wherein the upper machine body comprises a display module.

10. The wearable device as claimed in claim 1, wherein one of side surfaces of the battery casing has a bending curvature or a notch.

* * * * *